July 4, 1967     J. PASTEKA     3,329,349
APPARATUS FOR PULVERIZING PLASTIC MATERIALS
Original Filed July 19, 1963     3 Sheets-Sheet 1

INVENTOR:
JOSEF PASTEKA
BY Kurt Kelman
AGENT

July 4, 1967  J. PASTEKA  3,329,349
APPARATUS FOR PULVERIZING PLASTIC MATERIALS
Original Filed July 19, 1963  3 Sheets-Sheet 2

INVENTOR:
JOSEF PASTEKA
BY Kurt Kelman
AGENT

United States Patent Office 3,329,349
Patented July 4, 1967

3,329,349
APPARATUS FOR PULVERIZING PLASTIC MATERIALS
Josef Pasteka, Am Laubersberg 26, Steinheim am Main, Germany
Original application July 19, 1963, Ser. No. 296,181, now Patent No. 3,232,543, dated Feb. 1, 1966. Divided and this application Oct. 18, 1965, Ser. No. 497,289
Claims priority, application Germany, July 21, 1962, C 27,523
2 Claims. (Cl. 241—34)

This is a division of my copending application Ser. No. 296,181, filed July 19, 1963, now Patent No. 3,232,543.

The present invention relates to an apparatus for pulverizing thermoplastic organic polymer materials.

The afore-mentioned materials are characterized by great toughness at normal and elevated temperatures and are extremely difficult to grind. Thus, liquid nitrogen has been used heretofore to maintain the grinding stock in a brittle state. The cost of the ground material is considerably increased by that of the liquid nitrogen.

Accordingly, a primary object of this invention is to provide an apparatus which permits economical pulverization of materials of the afore-mentioned type.

In the apparatus of the invention the material is pre-crushed to a grain size of approximately 3 to 6 mm.; introduced into an air stream in such a proportion that the grinding process carried out thereafter takes place at a temperature equal to approximately one half the softening temperature of the material; and the material is removed from the grinding zone as soon as it has been ground to a particle size between 50 and 500 microns, together with at least a portion of the air stream.

Thus the present invention provides for pulverization of the material in a state in which it is relatively far from becoming soft, thereby avoiding any excessive energy consumption by the material itself.

Another advantage is that the ground material is removed from the mill immediately after it has been reduced to a grain size of 50 to 500 microns. Thus an accumulation of pulverized material in the mill, which would cause the temperature to rise, is avoided.

The pulverizer substantially consists of a housing having a central feeding aperture and of a rotor rotatably mounted inside the housing. The rotor is circumferentially enclosed by a screen.

The rotor is provided with blade members which move relative to the screen whose opening size corresponds to the desired fineness of the ground stock.

Pulverization of the material is effected by a combined impact-and-cutting action between the cutting edges of the rotor blades and inner edges of ridge or saw-tooth sections of the screen.

Further details and advantages of the invention will become apparent from the following specification, when read in conjunction with the appended drawing wherein.

Figure 7:
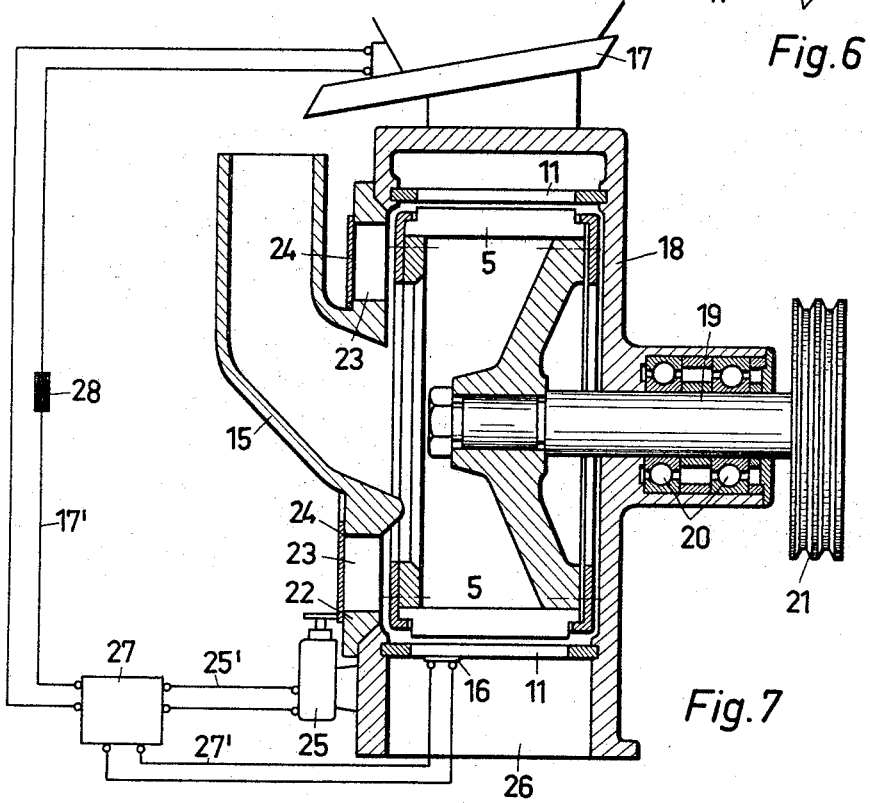
FIGURE 7 shows the mill in elevational section on its axis, and its electrical controls in a conventional manner.

Referring now to the drawing in detail, and initially to FIG. 7, there is seen a pulverizing mill of the invention which has a stationary housing 18. A bearing 20 mounted on the housing supports a shaft 19 one end of which carries a drive pulley 21 outside the housing whereas the other end of the shaft carries a rotor within the housing.

Figures 1, 2:
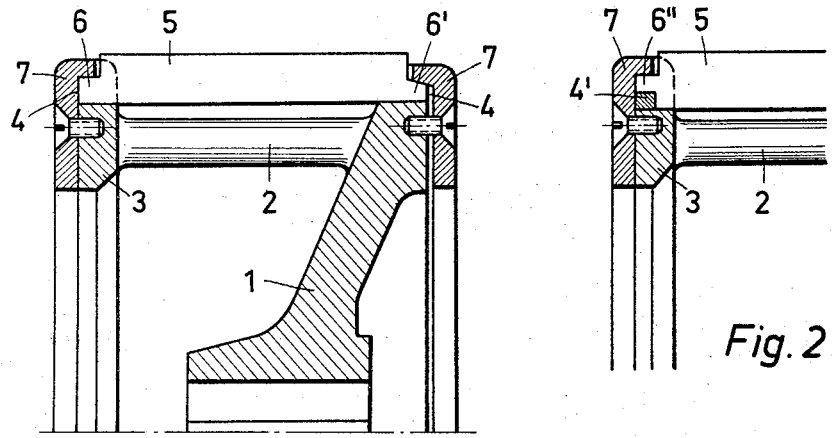
FIGURE 1 shows the rotor of a mill according to the invention in axial section.
FIGURE 2 shows a modified rotor in a fragmentary view analogous to that of FIG. 1.
Figure 4:
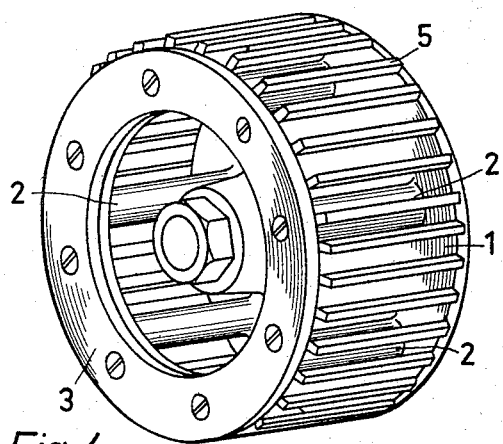
FIGURE 4 is a perspective view of the rotor.

The rotor, seen in more detail in FIGS. 1 and 4, includes a disk 1 fastened to the inner end of the shaft 19 and peripherally connected to a coaxial ring 3 by rods 2, omitted from the showing of FIG. 7 for the sake of clarity. Axially aligned radial slots 4 in the ring 3 and the disk 1 receive respective end portions 6, 6' of circumferentially spaced blades 5 which are radially offset from the exposed edges of the blades. The blades are retained in the slots 4 by annular covers 7, and their end portions 6, 6' rest on corresponding faces of the ring 3 and the disk 1.

In the modified rotor partly shown in FIG. 2, a supporting ring 4' is interposed in the slots 4 between the end portions 6'' of each blade and the supporting surfaces of the ring 3 and the disk 1, the blade being of symmetrical shape.

Figure 3:
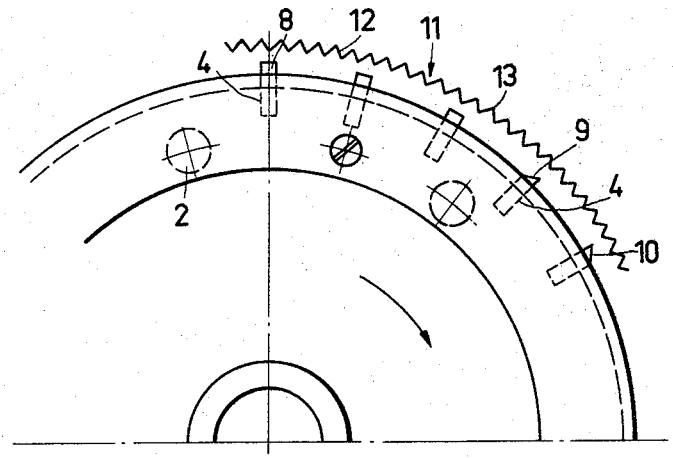
FIGURE 3 is a partial front elevation of the rotor of FIG. 1 and of associated elements of the mill.

FIG. 3 shows examples of blade configurations in the mill of the invention. The exposed edges of the blades 8 are of rectangular cross section. The blade 9 has an exposed edge formed by a leading face that extends in an axial plane and a trailing face which obliquely intersects the leading face. In the blade 10, the trailing face extends in an axial plane, and the leading face is obliquely inclined.

Figure 5:
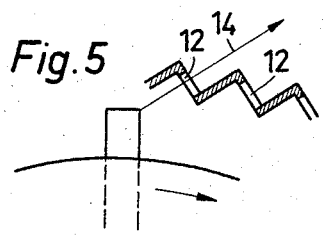
FIGURE 5 is an enlarged detail view of the rotor and the associated screen.
Figure 6:
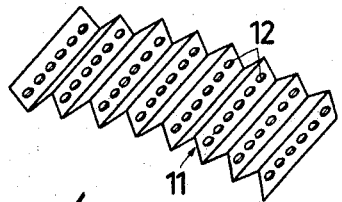
FIGURE 6 is a perspective view of a part of the screen.

Revertign now to FIG. 7, the rotor is coaxially enveloped in the housing 18 by a stationary screen 11. The screen is a corrugated sheet member, as best seen in FIG. 6, whose ridges 13 are axially elongated. Rows of openings 12 are formed in the screen portions which face in the direction of rotor rotation. The axes 14 of the openings are approximately tangential to the rotor, as best seen in FIG. 5.

The radial wall 22 of the housing 18 opposite the shaft 19 has a central aperture fitted with an inlet duct 15. Vent openings 23 are arranged in the wall 22 about the duct 15 and are provided with a common annular closure plate 24 which may be rotated by a motor 25 to open and close the orifices of the openings 23.

A bin for material to be ground is arranged above the mill and is provided with an electrically operated chute 17 leading to the duct 15. The open bottom of the housing 18 forms a discharge duct 26.

A temperature sensing device 16, whose sensing element is a thermistor, is installed on the screen 11 at the discharge duct 26. It controls the operation of the chute 17 and of the motor 25 to increase the air supply to the grinding zone and to decrease the rate of supply of the material to be ground when the temperature in the grinding zone, as sensed by the device 16, exceeds a desired limit, and to decrease the air supply and increase the solids supply at lower temperatures.

The sensing device 16 is connected to a transductor 26 by leads 27'. Leads 25' connect the transductor to the motor 25, and lead 17' to the chute 17. A resistor 28 in one of the leads 17' modifies the response of the chute 17 to the temperature sensed by the device 16.

Figure 8:
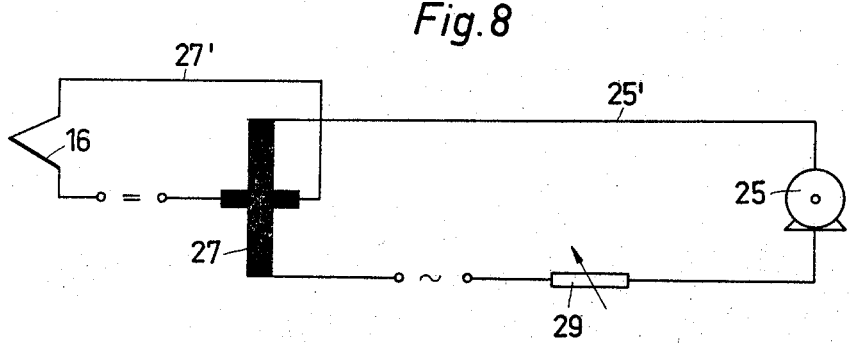
FIGURE 8 is a circuit diagram of modified controls.
Figure 9:
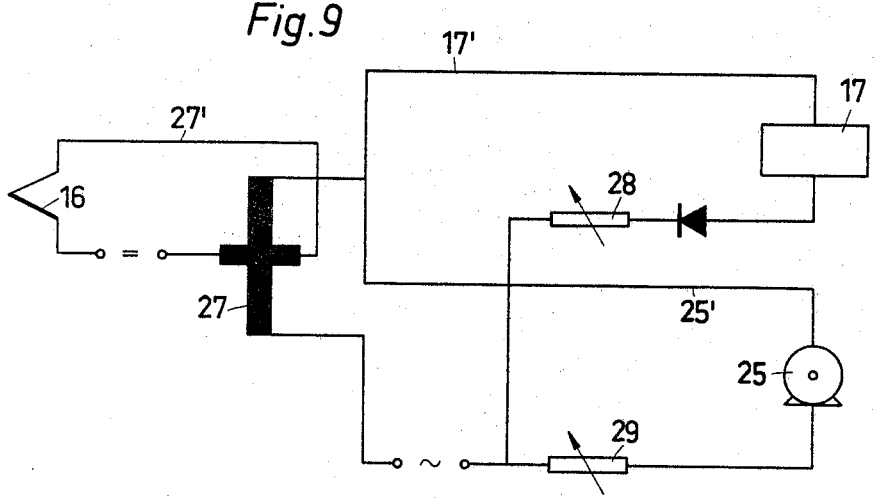
FIGURE 9 is another circuit diagram of controls for the mill of FIG. 7.

In the modified control circuit shown in FIG. 8, the sensing device 16 and transductor 26 control only the motor 25 whose response may be varied by adjusting a variable resistor 29 in one of the leads 25'. In the circuit of FIG. 9, the motor 25 as well as the chute 17 are controlled by the sensing device 16, and the response of either may be adjusted by respective resistors 29, 28.

The following examples illustrate the operation of the mill illustrated in the drawing.

*Example 1*

Polyethylene granules having a particle size of approximately 4 mm. were fed to the inlet duct 15 while the mill was rotating at 3,100 r.p.m. The rotor had a diameter of 680 mm., and the screen openings 12 were 0.8 mm. The throughput of polyethylene was about 125 kg. per hour, the power consumption 70 H.P. With an ambient temperature of 14° C., the temperature sensed by the thermistor 16 was held at 43° C. The air flow through the mill was maintained at approximately 70 m.³ per minute. The particle size distribution of the product obtained was determined by sieve analysis.

| Sieve analysis, microns: | Oversize products in percent |
|---|---|
| 600 | 1.5 |
| 500 | 2.0 |
| 400 | 14.0 |
| 300 | 19.0 |
| 200 | 39.0 |
| Under 200 | 19.0 |

*Example 2*

The mill described in Example 1 was fitted with a a screen having apertures of 0.5 mm., and was fed rigid polyvinylchloride in granules of 10 mm. size while rotating at 3,100 r.p.m. When the drive motor of the mill consumed 90 amperes, the mill produced 115 kg. of powder per hour, at a current consumption of 110 amperes, the throughput was 145 kg. per hour. The corresponding power consumption was 60 and 80 H.P. respectively. An operating temperature of 49° C. to 61° C. was maintained with an ambient temperature of 24° C.

| Sieve analysis, microns: | Oversize products in percent |
|---|---|
| 500 | — |
| 400 | Traces |
| 300 | 2.0 |
| 200 | 23.0 |
| 100 | 62.0 |
| Less than 100 | 13.0 |

While the novel features of the invention have been described as applied to preferred embodiments, it will be obvious that modifications of the apparatus illustrated may be made without departing from the spirit and the scope of the invention as defined by the following claims.

I claim:
1. An apparatus for pulverizing thermoplastic organic polymer material comprising, in combination:
    (a) a housing having an inlet means and discharge means;
    (b) a rotor mounted in said housing for rotation about an axis;
    (c) a plurality of circumferentially spaced blade members on said rotor, said blade members defining openings therebetween communicating with said inlet means;
    (d) a screen spacedly surrounding said rotor in said housing;
    (e) first feed means for admitting air to said housing;
    (f) second feed means for admitting said material to said inlet means;
    (g) temperature sensing means on said screen; and
    (h) control circuit means operatively connecting said sensing means to at least one of said feed means for controlling the ratio of the admitted air and material in response to the sensed temperature.
2. An apparatus as set forth in claim 1, wherein said screen has a portion radially interposed between said blade members and said discharge means, and said temperature sensing means is arranged on said portion.

References Cited

UNITED STATES PATENTS 851,607   4/1907   Du Pont _____ 241—6

FOREIGN PATENTS 1,005,221   4/1952   France.

WILLIAM W. DYER, Jr., *Primary Examiner.*

R. J. ZLOTNIK, *Assistant Examiner.*